(12) United States Patent
Meeks et al.

(10) Patent No.: US 11,089,726 B2
(45) Date of Patent: Aug. 17, 2021

(54) LAWNMOWER MULCH PLUG FIXING METHOD

(71) Applicant: HONDA MOTOR CO., LTD., Tokyo (JP)

(72) Inventors: Christopher D Meeks, Greensboro, NC (US); Steven J. Busjahn, Yanceyville, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 637 days.

(21) Appl. No.: 15/935,891

(22) Filed: Mar. 26, 2018

(65) Prior Publication Data

US 2019/0289784 A1   Sep. 26, 2019

(51) Int. Cl.
| | | |
|---|---|---|
| *A01D 34/81* | (2006.01) | |
| *F16B 4/00* | (2006.01) | |
| *A01D 101/00* | (2006.01) | |
| *A01D 34/00* | (2006.01) | |
| *A01D 42/00* | (2006.01) | |

(52) U.S. Cl.
CPC ........... *A01D 34/81* (2013.01); *A01D 34/005* (2013.01); *A01D 42/005* (2013.01); *F16B 4/004* (2013.01); *A01D 2101/00* (2013.01)

(58) Field of Classification Search
CPC .... A01D 34/81; A01D 34/005; A01D 42/005; A01D 2101/00; F16B 4/004
See application file for complete search history.

(56) References Cited

U.S. PATENT DOCUMENTS

| | | | | |
|---|---|---|---|---|
| 2,857,727 A | * | 10/1958 | Cole | A01D 34/71 56/320.2 |
| 2,983,096 A | * | 5/1961 | Phelps | A01D 34/71 56/255 |
| 3,118,267 A | * | 1/1964 | Shaw | A01D 34/71 56/17.5 |
| 3,646,739 A | * | 3/1972 | Dahl | A01D 34/828 56/320.1 |
| 3,750,378 A | * | 8/1973 | Thorud | A01D 43/0631 56/10.5 |
| 3,919,832 A | * | 11/1975 | Christopherson | A01D 34/71 56/320.2 |
| 4,189,903 A | | 2/1980 | Jackson et al. | |
| 4,205,512 A | | 6/1980 | Thorud | |
| 4,312,174 A | * | 1/1982 | Vanderhoef | A01D 34/71 56/255 |
| 4,435,949 A | * | 3/1984 | Heismann | A01D 42/005 56/17.5 |
| 4,835,952 A | * | 6/1989 | McLane | A01D 34/74 280/43.13 |
| 4,864,808 A | | 9/1989 | Weber | |

(Continued)

FOREIGN PATENT DOCUMENTS

JP        H05133524 A    4/1993

*Primary Examiner* — Thomas B Will
*Assistant Examiner* — Joan D Misa
(74) *Attorney, Agent, or Firm* — Arent Fox LLP

(57) ABSTRACT

The present disclosure is directed to a mulch plug configured to attach to a lawnmower by one or more attachment points, including a snap-fit attachment point. The snap-fit provides a more secure attachment to the lawnmower than attachment mechanisms on existing mulch plugs, in turn providing more even distribution of mulch and less clogging and locking of mower wheels.

20 Claims, 6 Drawing Sheets

(56) References Cited

U.S. PATENT DOCUMENTS

| | | | | |
|---|---|---|---|---|
| 4,951,449 A * | 8/1990 | Thorud | ................ | A01D 42/005 56/2 |
| 5,090,183 A | 2/1992 | Thorud et al. | | |
| 5,205,112 A | 4/1993 | Tillotson et al. | | |
| 5,284,007 A | 2/1994 | Poe et al. | | |
| 5,410,867 A | 5/1995 | Plamper et al. | | |
| 5,442,902 A | 8/1995 | Mosley et al. | | |
| 6,085,508 A * | 7/2000 | Miatt | .................... | A01D 34/74 56/17.1 |
| 6,735,932 B2 * | 5/2004 | Osborne | .............. | A01D 42/005 56/17.5 |
| 6,990,793 B2 * | 1/2006 | Osborne | .............. | A01D 42/005 56/320.1 |
| 7,171,799 B2 * | 2/2007 | Takeishi | ................. | A01D 34/81 56/320.1 |
| 7,571,593 B2 | 8/2009 | Kucera et al. | | |
| 7,805,920 B2 * | 10/2010 | Hurst | ................... | A01D 43/063 56/320.2 |
| 8,015,785 B2 | 9/2011 | Walker et al. | | |
| 8,127,522 B2 * | 3/2012 | Campbell | ............ | A01D 34/005 56/320.2 |
| 8,196,382 B2 * | 6/2012 | Foster, III | .............. | A01D 34/81 56/320.1 |
| 8,653,786 B2 | 2/2014 | Baetica et al. | | |
| 9,510,503 B2 * | 12/2016 | Elhardt | ................ | A01D 34/001 |
| 10,638,662 B2 * | 5/2020 | Spitz | .................... | A01D 34/005 |
| 2003/0182919 A1 | 10/2003 | Baumann et al. | | |
| 2012/0233975 A1 | 9/2012 | Coussins | | |
| 2015/0359175 A1 * | 12/2015 | Klupt | .................... | A01D 34/67 56/320.1 |

* cited by examiner

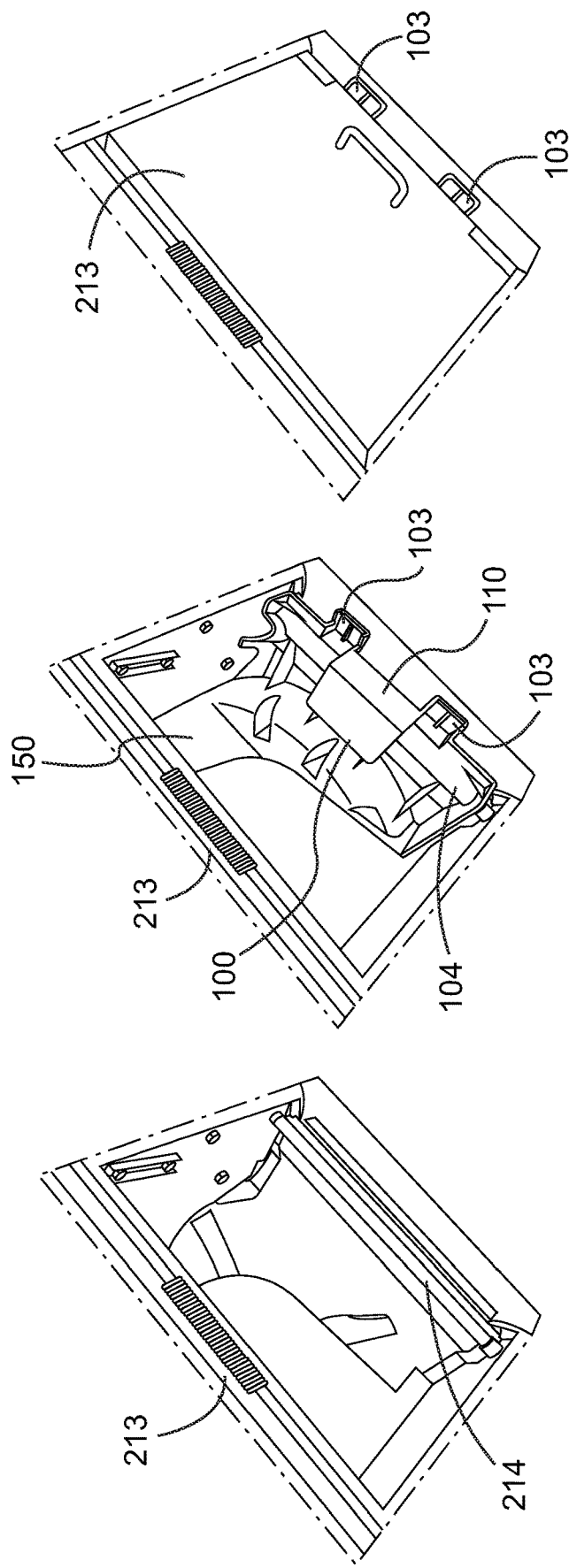

LAWNMOWER MULCH PLUG FIXING METHOD

BACKGROUND

The present disclosure is directed to a lawnmower mulch plug, as may be attached to a lawnmower for the direct conversion of lawn clippings into mulch, instead of collecting the lawn clippings for disposal. Mulch plugs may be installed by attachment to the lawnmower axle (for example, the rear axle of the lawnmower) and/or to one or more domes or bells of the lawnmower. However, the modes of attachment used in conventional mowers do not keep the mulch plug securely attached throughout instrument use. FIG. 1 shows a close-up view of the point of attachment of a conventional mulch plug 10 to lower dome 212 of a lawnmower. The mulch plug 10 contains a support ledge 22 on the plug body to provide a support structure for attachment to the lower dome 212. However, such support ledges 22 may not actually facilitate installation of the mulch plug 10 by the operator. Alternatively, other conventional mulch plugs snap strongly to the rear axle and also contact the upper done, but the strong rear axle attachment makes it difficult for the operator to remove the mulch plug. Conventional mulch plugs have been known to slip out of position, thereby distorting the distribution of mulch deposited by the mower. The uneven distribution of mulch can lead to uneven absorption of nutrients by the underlying mowed lawn, and the mulch can also clog and lock the mower wheels, thereby limiting instrument life or at least requiring the operator to interrupt yardwork to clean the mower wheels. Accordingly, there is a need for a more secure means of mulch plug attachment.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In some embodiments, the present disclosure is directed to a mulch plug for a lawnmower, the mulch plug comprising: a plug body configured to fit within a collector opening of the lawnmower, the plug body comprising a first attachment configured to snap-fit to a lower dome of the lawnmower; a second attachment configured to interference-fit to an upper dome of the lawnmower; a mating surface configured to fit over a rear axle of the lawnmower; and one or more tabs, extending from the body and positioned to engage with an edge of a deflector of the lawnmower.

In some aspects, the plug body has two tabs.
In some aspects, the deflector is a rear deflector.
In some aspects, the deflector is a side deflector.
In some aspects, the plug body comprises a plastic plug body.
In some aspects, the plastic plug body comprises a plastic that is polypropylene, polypropylene high impact copolymers, high-density polyethylene (HDPE), low-density polyethylene (LDPE), acrylonitrile butadiene styrene (ABS), ultra high molecular weight polyethylene (UHMWPE), polycarbonate (PC), polyoxymethylene (POM), Nylon, or a combination thereof.

In some aspects, the plastic is a polypropylene high impact copolymer.

In some aspects, the second attachment is at the end of a lip protruding from the plug body at an angle of 65°.

In some embodiments, the present disclosure is directed to a mulch plug for a lawnmower, the mulch plug comprising: a plug body configured to fit within a collector opening of the lawnmower, the plug body comprising a first attachment configured to snap-fit to a lower dome of the lawnmower, and a second attachment configured to interference-fit to an upper dome of the lawnmower.

In some aspects, the plug body comprises a plastic plug body.

In some aspects, the plastic plug body comprises a plastic that is polypropylene, polypropylene high impact copolymers, high-density polyethylene (HDPE), low-density polyethylene (LDPE), acrylonitrile butadiene styrene (ABS), ultra high molecular weight polyethylene (UHMWPE), polycarbonate (PC), polyoxymethylene (POM), Nylon, or a combination thereof.

In some aspects, the plastic is a polypropylene high impact copolymer.

In some aspects, the second attachment is at the end of a lip protruding from the plug body at an angle of 65°.

In some embodiments, the present disclosure is directed to a mulch plug for a lawnmower, the mulch plug comprising: a plug body configured to fit within a collector opening of the lawnmower, the plug body comprising one or more tabs extending from the body and positioned to engage with an edge of a deflector of the lawnmower.

In some aspects, the plug body has two tabs.
In some aspects, the deflector is a rear deflector.
In some aspects, the deflector is a side deflector.
In some aspects, the plug body comprises a plastic plug body.
In some aspects, the plastic plug body comprises a plastic that is polypropylene, polypropylene high impact copolymers, high-density polyethylene (HDPE), low-density polyethylene (LDPE), acrylonitrile butadiene styrene (ABS), ultra high molecular weight polyethylene (UHMWPE), polycarbonate (PC), polyoxymethylene (POM), Nylon, or a combination thereof.

In some aspects, the plastic is a polypropylene high impact copolymer.

These and other aspects of the invention will become more fully understood upon a review of the detailed description, which follows.

BRIEF DESCRIPTION OF THE DRAWINGS

FIG. 3A shows a lawnmower for use with a mulch plug according to some aspects of the present disclosure.

FIG. 3B shows a mulch plug according to some aspects of the present disclosure installed in the lawnmower shown in FIG. 3A.

FIG. 3C shows the lawnmower of FIG. 3B with the mulch plug installed and the deflector in place.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The present disclosure is directed to a mulch plug for a lawnmower, comprising a plug body configured to cover a collector opening of the lawnmower, with improved points for attachment of the plug body to the lawnmower. The attachment points of the plug body described herein to the lawnmower are configured to snap-fit to the lower dome of the lawnmower, eliminating the need for a built-in ledge for attachment to the lower dome, or alternatively the need for support in the lower dome area of the lawnmower itself. In addition, the mulch plug body is configured to interference-fit to the upper dome of the lawnmower, such as at an angle. In addition, the mulch plug body contains one or more tabs extending from the plug body and positioned and configured to engage the edge of a deflector of the lawnmower. The mulch plug may further contain a mating surface configured to fit over a rear axle of the lawnmower.

The mulch plug of the present disclosure offers several advantages over conventional mulch plugs. The snap-fit point(s) of attachment make installation and removal of the mulch plug easier for the operator. In addition, the attachment points fit more securely to the lawnmower. This minimizes slipping of the installed mulch plug during lawnmower operation, thus avoiding clogging and/or locking of the wheels with mulch and/or clippings, in turn improving machine life. Lastly, the reduced slipping of the installed mulch plug provides a more even distribution of the mulch over the lawn.

Figure 1:
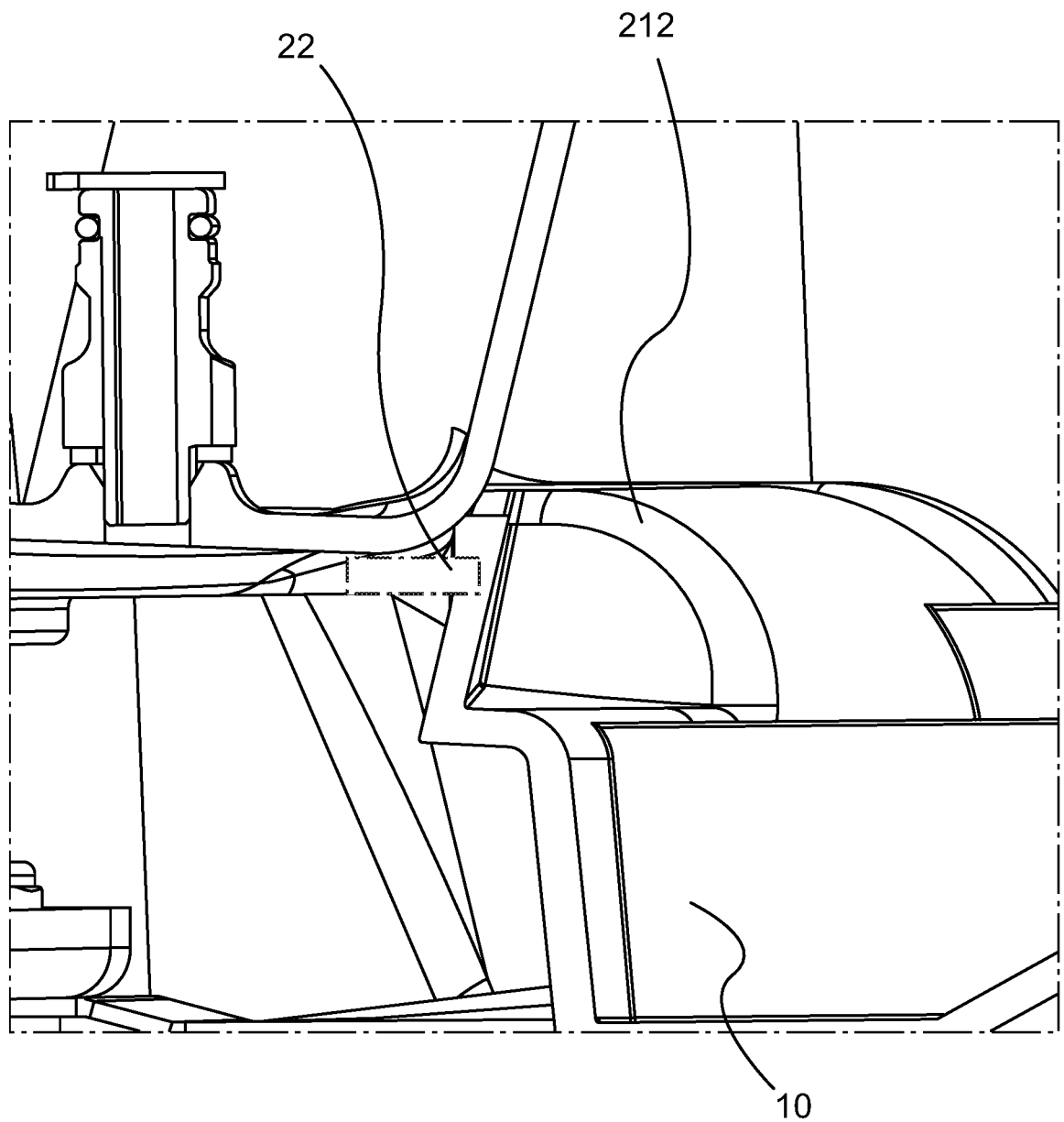
FIG. 1 shows a close-up view of the attachment point of a conventional mulch plug to the lower dome of a lawnmower.
Figure 2A:
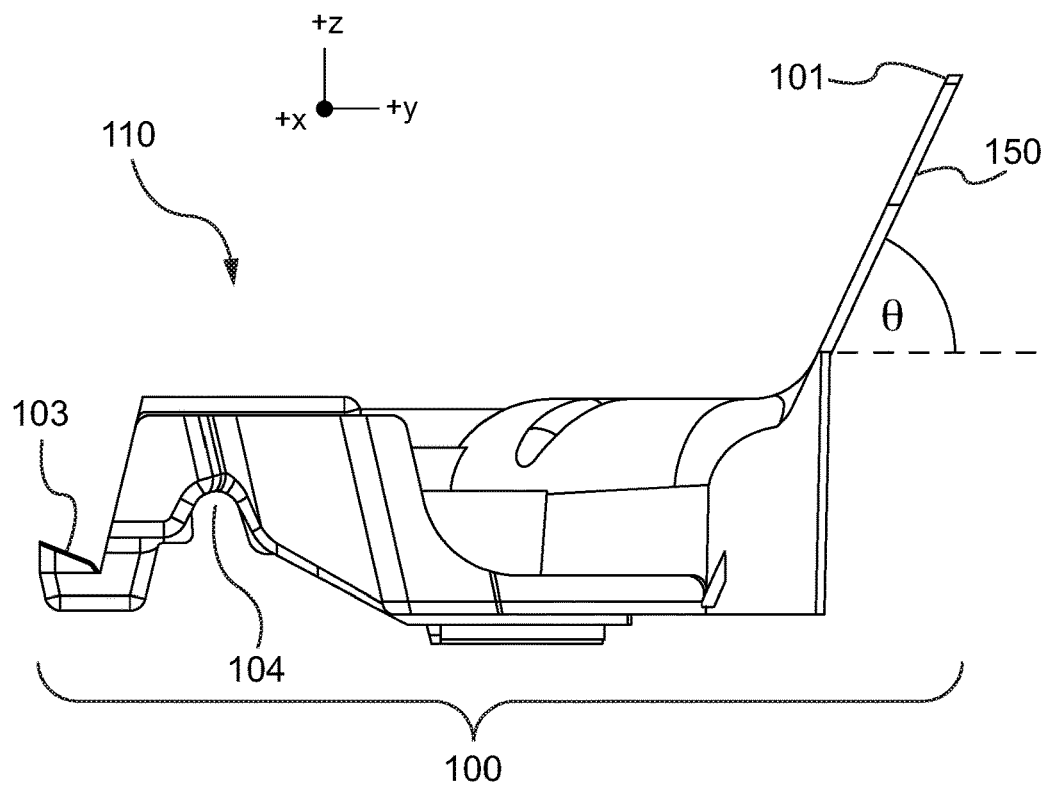
FIG. 2A shows a right side perspective view of a mulch plug according to some aspects of the present disclosure.
Figure 2B:
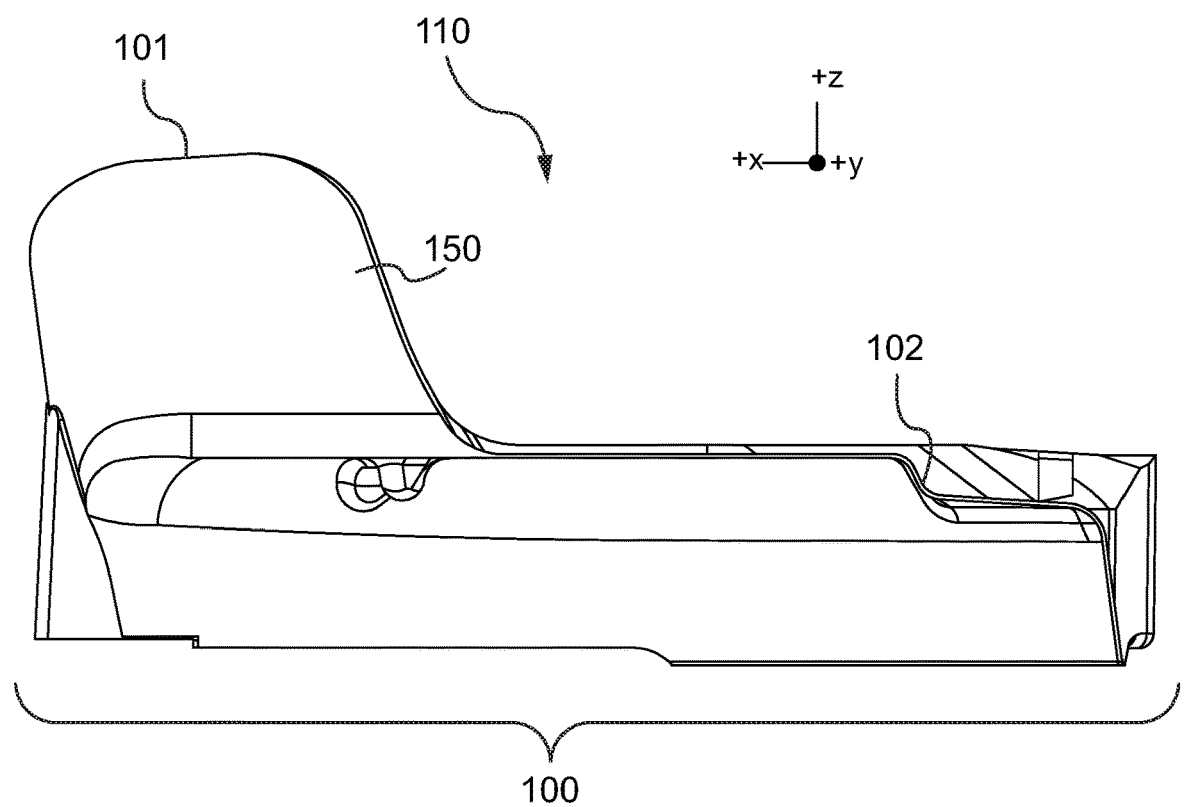
FIG. 2B shows a frontal perspective view of the mulch plug shown in FIG. 2A.

FIGS. 2A and 2B show side and frontal perspective views, respectively, of a mulch plug 110 with plug body 100. When installed in a lawnmower, the mulch plug 110 is positioned such that the direction of forward motion of the lawnmower is in the positive y-direction as shown in FIGS. 2A-2B. The mulch plug 110 is adapted or configured to cover a collector opening of a lawnmower, such as the opening where a bag or other collection vessel may be attached to collect grass clippings.

The mulch plug body 100 has up to four points of attachment to the lawnmower itself: upper dome attachment 101, lower dome attachment 102, one or more tabs 103, and/or rear axle cover 104. In some aspects, the mulch plug body 100 comprises upper dome attachment 101 and lower dome attachment 102. In some aspects, the mulch plug body comprises upper dome attachment 101, lower dome attachment 102, and rear axle cover 104. In some aspects, the mulch plug body 100 comprises one or more tabs 103. In some aspects, the mulch plug body comprises one or more tabs 103 and rear axle cover 104. In some aspects, the mulch plug body comprises upper dome attachment 101, lower dome attachment 102, one or more tabs 103, and rear axle cover 104. In the aspect shown in FIGS. 2A and 2B, the mulch plug body comprises upper dome attachment 101, lower dome attachment 102, one or more tabs 103, and rear axle cover 104.

Lower dome attachment 102 is configured to snap-fit to the lower dome of the lawnmower, and upper dome attachment 101 is configured to interference-fit to the upper dome of the lawnmower. As used herein, an attachment is configured to "snap-fit" to a given surface or point on the lawnmower if the attachment is able to be pressed into place securely without requiring additional support, fasteners, or tools. As used herein, an "interference fit" between two surfaces or objects is one where the two surfaces or objects meet at an interface but they do not snap-fit, fasten, or flush to one another, but one abuts the other in a way that interferes with movement of the two surfaces or objects relative to one another. Upper dome attachment 101 is at the end of a lip 150 protruding from the plug body 100 at an angle θ from the horizontal, wherein θ is less than 90°, such as 85°, 80°, 75°, 70°, 65°, 60°, 55°, 50°, 45° or any integer or range in between. In some aspects, θ is 65°. An increased angle θ results in a greater buildup of grass clippings and, in turn, greater power for discharging clippings.

The one or more tabs 103 extend from the plug body 100 and are positioned and configured to engage an edge of a deflector 213 (FIG. 3B) of the lawnmower. In the aspect shown in FIG. 2A, the one or more tabs 103 extend from the rear of plug body 100. The deflector may be a rear deflector or a side deflector that is moved or removed so as to attach a bag or other collection vessel to collect lawn clippings. When the deflector is in place, grass clippings and debris striking it are deflected away from the area where there may otherwise be a collector attached. FIGS. 3A-3C show a rear perspective view of a lawnmower. In FIG. 3A, the deflector 213 has been raised and moved away from the collector opening. FIG. 3B shows the same view but with mulch plug 110 with plug body 100 installed. Two tabs 103 extend from the plug body (e.g., from the rear). FIG. 3C shows the same view but with deflector 213 lowered to the collector opening and engaged by tabs 103.

Rear axle cover 104 (see FIG. 2A) is a mating surface that is configured to fit over the rear axle of a lawnmower. In some aspects, rear axle cover 104 is configured to press-fit to the rear axle. As used herein, a "press-fit" is less secure than a snap-fit. FIG. 3A shows rear axle 214 of a lawnmower, and FIG. 3B shows plug body 100 with rear axle cover 104 fitting over the rear axle (not shown).

Figure 4A:
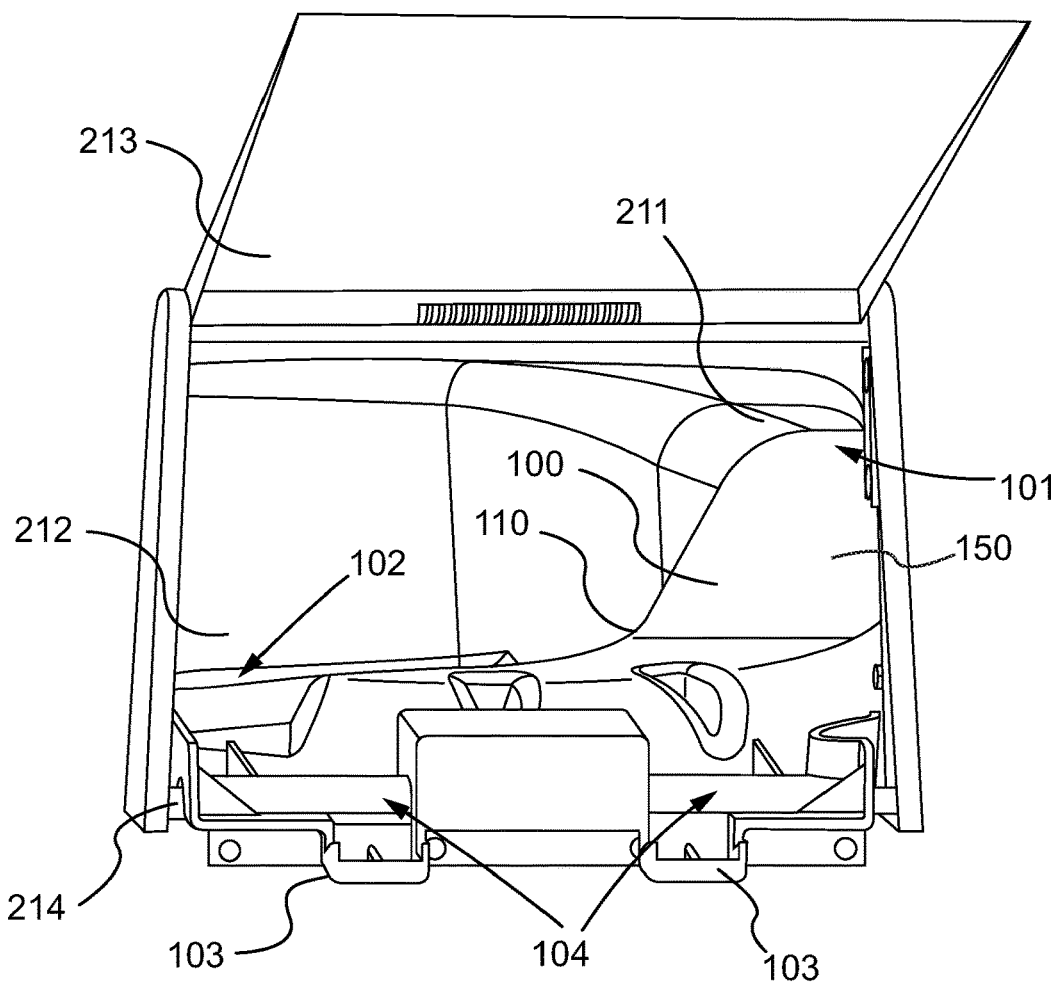
FIG. 4A shows a rear perspective view of a mulch plug according to some aspects of the present disclosure installed in a lawnmower, showing the points of attachment to the upper and lower domes.
Figure 4B:
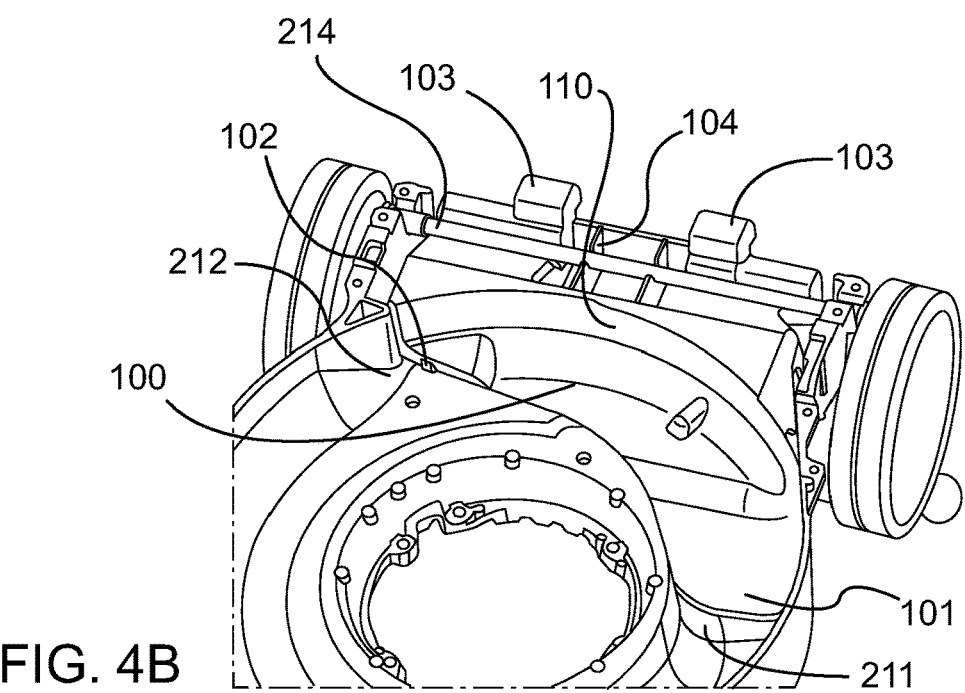
FIG. 4B shows a bottom perspective view of the installed mulch plug shown in FIG. 4A.

FIG. 4A shows a rear perspective view of a mulch plug 110 according to some aspects of the present disclosure installed in a lawnmower. Plug body 100 is shown, with upper dome attachment 101 attached to upper dome 211, lower dome attachment 102 attached to lower dome 212, tabs 103 configured to engage an edge of deflector 213 (repositioned for clarity), and rear axle cover 104 covering rear axle 214. FIG. 4B shows an alternate view of FIG. 4A, from underneath.

Figure 4C:
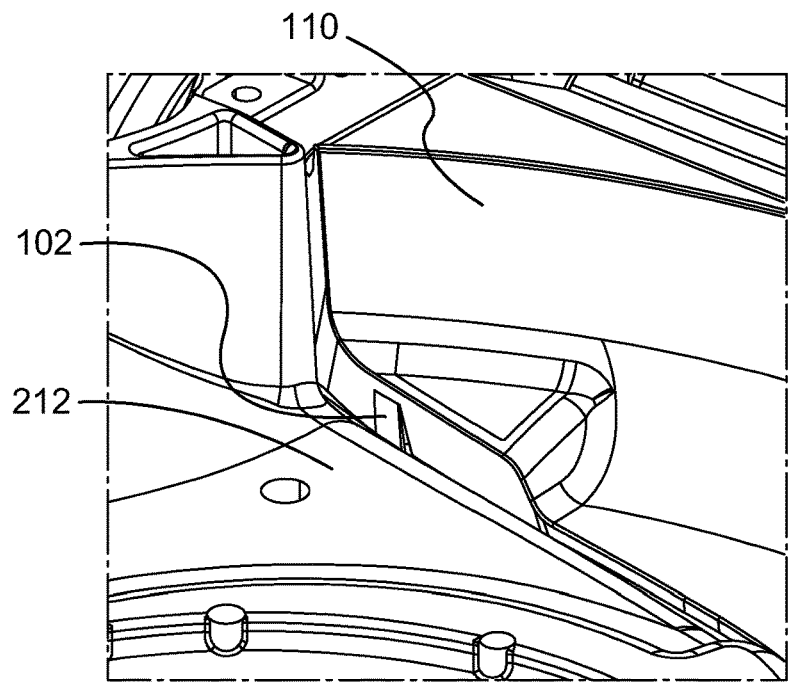
FIG. 4C shows a close-up view of the view shown in FIG. 4B at the point of attachment of the mulch plug to the lower dome.
Figure 4D:
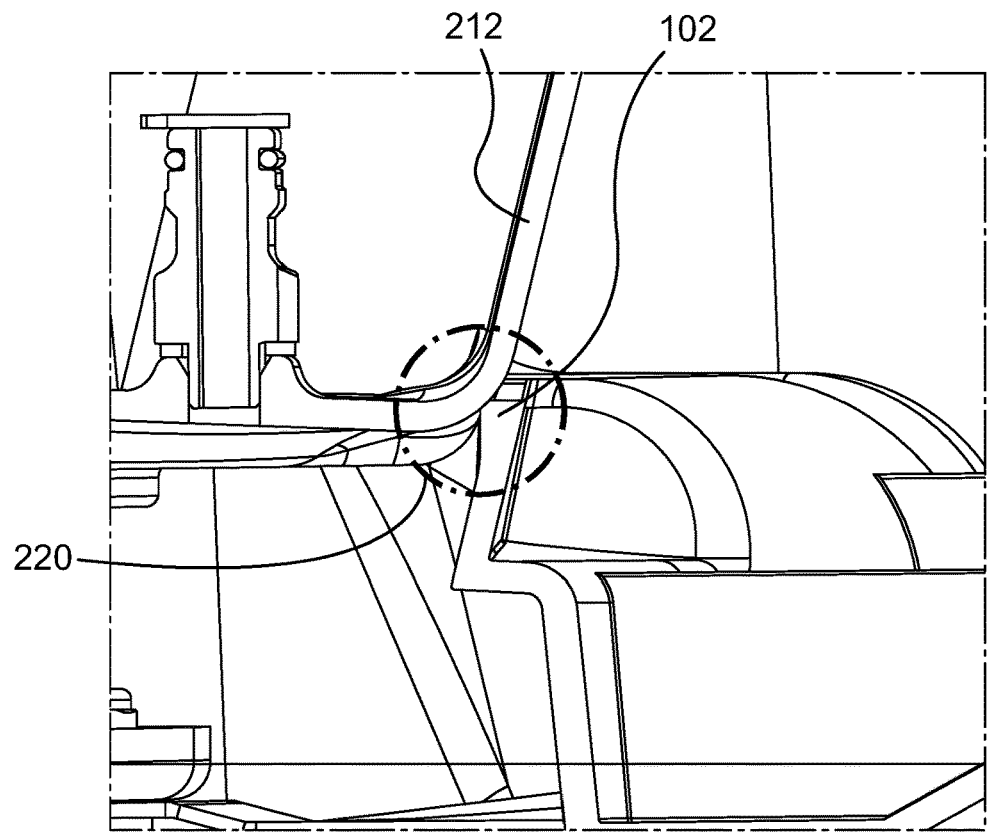
FIG. 4D shows a longitudinal cross-section of the attachment point of the mulch plug shown in FIG. 4C to the lower dome of the lawnmower.

FIG. 4C shows a close-up view of the point of attachment of the plug 110 to the lower dome 212. In the aspect shown, lower dome attachment 102 is a tab that snaps the mulch plug 110 to the mower. FIG. 4D shows a close-up, cross-sectional view of lower dome attachment 102 attached to lower dome 212. Lower dome attachment 102 is configured, by its shape, to snap fit to lower dome 212 at location 220, independent of any support structures located in the lower dome itself.

Figure 4E:
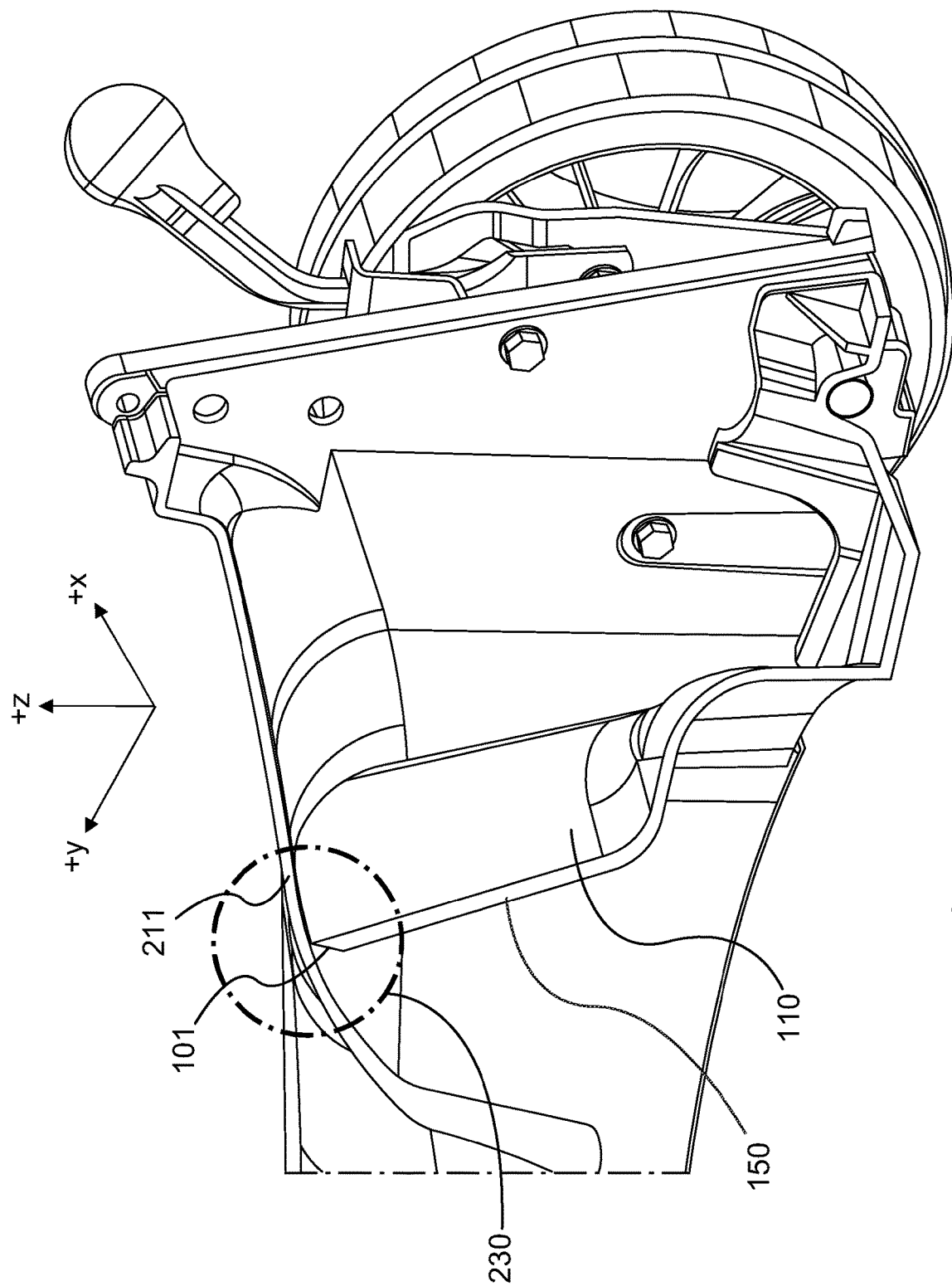
FIG. 4E shows a longitudinal cross-section of a mulch plug according to some aspects of the present disclosure installed in a lawnmower.

FIG. 4E shows a partial longitudinal cross-section of the mulch plug installed in a lawnmower. The interface of the upper dome attachment 101 with the upper done 211 is shown at location 230. The upper dome attachment 101 presents an angle to the upper dome 211, not flush to the surface of the upper dome 211 with the full thickness of the mulch plug 110 at upper dome attachment point 101. As a result of the angled interface, in conjunction with lower dome attachment 102, tabs 103, and rear axle cover 104, forces with y and z components arising from circulation of clipping and debris are insufficient to dislodge the mulch plug 110.

Installing the mulch plug confines the volume in which the grass clippings can circulate to just a domed area in the vicinity of the mower blade. As a result, the clippings are forced to recirculate more in the vicinity of the mower blade and are cut additional times into smaller, finer pieces. The finer pieces result in a more even distribution of the clippings on the ground.

The mulch plug of the present disclosure may be made from any number of materials, such as plastics, and may be manufactured by any suitable means known to those of ordinary skill in the art, such as by injection molding, casting, etc. Suitable materials for the manufacture of the mulch plug include those which are able to withstand the pressure and temperature excursions of a lawnmower in operation over a period of time. Suitable plastics include those known to those of ordinary skill in the art, including, but not limited to, polypropylene, polypropylene high impact copolymers, high-density polyethylene (HDPE), low-density polyethylene (LDPE), acrylonitrile butadiene styrene (ABS), ultra high molecular weight polyethylene (UHMWPE), polycarbonate (PC), polyoxymethylene (POM), Nylon, or a combination thereof. In some aspects, the plastic is a polypropylene high impact copolymer.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

Moreover, all references throughout this application, for example patent documents including issued or granted patents or equivalents; patent application publications; and non-patent literature documents or other source material; are hereby incorporated by reference herein in their entireties, as though individually incorporated by reference.

What is claimed is:

1. A mulch plug for a lawnmower, the mulch plug comprising:
   a plug body configured to fit within a collector opening of a lawnmower, the plug body comprising
      a first attachment configured to snap-fit to a lower dome of the lawnmower;
      a second attachment configured to interference-fit to an upper dome of the lawnmower;
      a mating surface dimensioned to press fit over a rear axle of the lawnmower; and
      one or more tabs, extending from the body and positioned to engage with an edge of a deflector of the lawnmower.

2. The mulch plug of claim 1, wherein the plug body has two tabs, wherein the tabs engage with an edge of the deflector when the deflector is in a closed position.

3. The mulch plug of claim 1, wherein the deflector is a rear deflector and wherein the tabs are located rearward of the mating surface when the mulch plug is installed into a collector opening of the lawnmower.

4. The mulch plug of claim 1, wherein the deflector is a side deflector.

5. The mulch plug of claim 1, wherein the plug body comprises a plastic plug body.

6. The mulch plug of claim 5, wherein the plastic plug body comprises a plastic that is polypropylene, polypropylene high impact copolymers, high-density polyethylene (HDPE), low-density polyethylene (LDPE), acrylonitrile butadiene styrene (ABS), ultra high molecular weight polyethylene (UHMWPE), polycarbonate (PC), polyoxymethylene (POM), Nylon, or a combination thereof.

7. The mulch plug of claim 6, wherein the plastic is a polypropylene high impact copolymer.

8. The mulch plug of claim 1, wherein the second attachment is at the end of a lip protruding from the plug body at an angle of 65°.

9. A mulch plug for a lawnmower, the mulch plug comprising:
a plug body configured to fit within a collector opening of a lawnmower, the plug body comprising
a first attachment configured to snap-fit to a lower dome of the lawnmower, and
a second attachment configured to interference-fit to an upper dome of the lawnmower, and
a mating surface to press fit over a rear axle of the lawnmower.

10. The mulch plug of claim 9, wherein the plug body comprises a plastic plug body.

11. The mulch plug of claim 10, wherein the plastic plug body comprises a plastic that is polypropylene, polypropylene high impact copolymers, high-density polyethylene (HDPE), low-density polyethylene (LDPE), acrylonitrile butadiene styrene (ABS), ultra high molecular weight polyethylene (UHMWPE), polycarbonate (PC), polyoxymethylene (POM), Nylon, or a combination thereof.

12. The mulch plug of claim 11, wherein the plastic is a polypropylene high impact copolymer.

13. The mulch plug of claim 9, wherein the second attachment is at the end of a lip protruding from the plug body at an angle of 65°.

14. A mulch plug for a lawnmower, the mulch plug comprising:
a plug body configured to fit within a collector opening of a lawnmower, the plug body comprising
one or more tabs, extending from the body and positioned to engage with an edge of a deflector of the lawnmower and
a mating surface configured to press fit over a rear axle of the lawnmower; and.

15. The mulch plug of claim 14 wherein the plug body has two tabs, wherein the tabs engage with the edge of the deflector when the deflector is in a closed position.

16. The mulch plug of claim 14, wherein the deflector is a rear deflector and wherein the tabs are located rearward of the mating surface when the mulch plug is installed into the collector opening of a lawnmower.

17. The mulch plug of claim 14, wherein the deflector is a side deflector.

18. The mulch plug of claim 14, wherein the plug body comprises a plastic plug body.

19. The mulch plug of claim 18, wherein the plastic plug body comprises a plastic that is polypropylene, polypropylene high impact copolymers, high-density polyethylene (HDPE), low-density polyethylene (LDPE), acrylonitrile butadiene styrene (ABS), ultra high molecular weight polyethylene (UHMWPE), polycarbonate (PC), polyoxymethylene (POM), Nylon, or a combination thereof.

20. The mulch plug of claim 19, wherein the plastic is a polypropylene high impact copolymer.

* * * * *